UNITED STATES PATENT OFFICE.

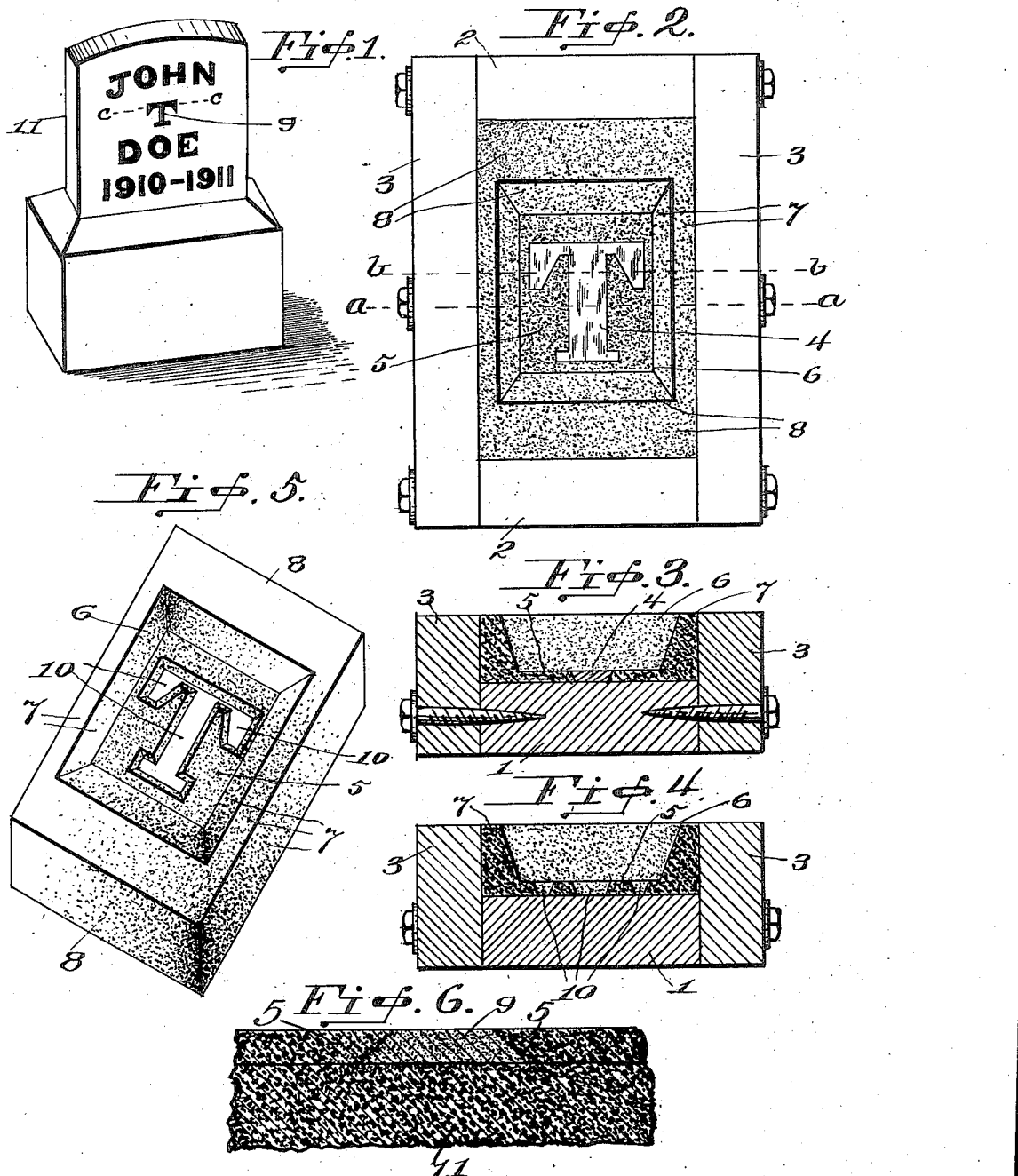

WILLIAM H. FILER, OF GROVE CITY, PENNSYLVANIA.

MONOLITHIC INSCRIPTION-STONE.

1,155,140.  Specification of Letters Patent.  Patented Sept. 28, 1915.

Application filed September 24, 1913. Serial No. 791,497.

*To all whom it may concern:*

Be it known that I, WILLIAM H. FILER, a citizen of the United States, residing at Grove City, in the county of Mercer and State of Pennsylvania, have invented certain new and useful Improvements in Monolithic Inscription-Stone, of which the following is a specification.

This invention relates to articles composed of artificial stone, and for forming inscriptions therein.

The object of the invention is to provide tombstones, sign-posts, and various other articles composed of artificial stone having inscriptions formed therein during the process of forming the articles, so that the finished article will constitute a monolithic block, post, slab, or other articles as desired having plastic inscriptions embedded therein and showing flush with the surface of such articles.

Various other objects, advantages and improved results are attainable in the practical application of the invention.

In the accompanying drawings forming part of this application:—Figure 1 is a perspective view exemplifying the invention. Fig. 2 is a plan view showing the artificial material molded around a pattern. Fig. 3 is a cross section on the plane indicated by the dotted line *a—a* Fig. 2. Fig. 4 is a similar view taken on the dotted line *b—b* Fig. 2, with the pattern removed and the plastic-letter material filled in. Fig. 5 is a perspective view of the article in the same condition shown in Fig. 4. Fig. 6 is a cross section taken on the dotted line *c—c* Fig. 1.

The same reference characters denote the same parts throughout the several views of the drawings.

The articles, and process of making the same are unlike the usual methods of stenciling, or of forming signs, plastic letters or inscriptions upon or into artificial stone, and the articles, and the process of making the same are unlike the usual method of first molding figures and forms in separate dies and uniting such molds with the main body or stock of the articles. My process is carried out and the completed articles having any desired plastic inscriptions embedded therein in the manner and form as will hereinafter be more practically explained.

For the purpose of carrying out the invention a molding apparatus is employed having a bottom 1, ends 2, and sides 3. The ends and sides being adjustably secured together and to the edges of the bottom so as to form a molding space of such depth as may be desired for any particular article. Obviously the said apparatus may be of any desired size and shape, according to the shape and size of the article to be produced, and may be clamped, screwed or otherwise secured together.

A pattern of the inscription desired is placed, face down, upon the bottom 1, and for the purpose of illustration, the letter T is here employed as the pattern 4. The artificial stone material is placed in the mold around the edges of the pattern-letter T, which has beveled edges, and such material is leveled or smoothed off flush with the back of the pattern so as to form a base 5 constituting a portion of the front face of the article under process of molding. Material of the same character as the base is filled into the mold upon the base and against the walls of the mold so as to form a concavity 6, having side walls 7 and end walls 8 flush with the edges of the frame. After the material constituting the base 5 and walls 7 and 8 has set and before they dry or harden, the pattern is removed. Obviously the removal of the pattern leaves its shape and configuration in an opening or openings through the base 5. A plastic material 9, congealable with the base and wall material but contrasting in color from that of the said base and walls, is filled into the pattern opening or openings 10, flush with both faces of the base 5. Then the concavity 6 is filled with artificial stone material 11 flush with the edges of the walls 7 and 8, and with said walls and said base, constitute one mass or body. A pallet is then placed upon the back of the mold and the latter turned upside down, and the mold disassembled, leaving the complete molded article to remain upon the pallet for drying and hardening.

It will be understood that the steps of the process are carried on successively without permitting any of the material to dry and harden, and such steps are briefly as follows:—First, placing the pattern in position; second, forming the base around the pattern; third, forming the concavity wall; fourth, removing the pattern; fifth, filling the pattern opening; sixth, filling the concavity; seventh, placing the pallet; eighth, turning the mold with the molded article therein; ninth, removing the mold and allowing the mass to dry and harden into one monolithic body.

In order to render the finished articles impervious to water and other elements, I apply a compound of paraffin and gasolene, or their equivalents, in a heated state.

It will be seen that a mechanical undercut interlock is formed between the letter or inscription and the body of the article, that the body and base material extend entirely over the finished letter or inscription except the face of the letter or inscription, and that the letter-material is embedded in the body material from the base 5 to the face of the article so as to form lateral V-shaped interlocks.

Obviously such embedding and undercut interlocking permanently fixes the letter or inscription within the main body of material, and that the letter-material is of such thickness as to form a considerable depth into the body material, so that the inscription face of an article may be ground, polished or otherwise renewed together with the inscription, and without loosening, defacing or injuring the inscription.

Having thus described my invention what I claim as new and desire to secure by Letters Patent is:—

An article of the character described composed of a plurality of concrete masses forming a solid mass and comprising a central member, an outer member partially inclosing the central member and forming the front of the article, and a different colored member extending from the central member at intervals through said front, said central members constituting the main body of the article and affording a base for the colored member, substantially as set forth.

In witness whereof I hereunto set my hand in the presence of two witnesses.

WILLIAM H. FILER.

Witnesses:
C. G. HENSHAW,
DAISIE M. WALTERS.